(12) United States Patent
Kwon et al.

(10) Patent No.: US 8,335,024 B2
(45) Date of Patent: Dec. 18, 2012

(54) MULTIPLE FEEDING PREVENTING APPARATUS AND IMAGE FORMING DEVICE INCLUDING THE SAME AND IMAGE FORMING METHOD

(75) Inventors: Hee-sang Kwon, Suwon-si (KR); Jae-In Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 655 days.

(21) Appl. No.: 12/533,137

(22) Filed: Jul. 31, 2009

(65) Prior Publication Data

US 2010/0118357 A1  May 13, 2010

(30) Foreign Application Priority Data

Nov. 7, 2008 (KR) .................. 10-2008-0110497

(51) Int. Cl.
| | |
|---|---|
| H04N 1/04 | (2006.01) |
| H04N 1/21 | (2006.01) |
| H04N 1/40 | (2006.01) |
| H04N 1/46 | (2006.01) |
| G03G 15/00 | (2006.01) |
| G03G 15/01 | (2006.01) |
| B65H 5/00 | (2006.01) |
| B65H 83/00 | (2006.01) |
| B65H 29/66 | (2006.01) |
| H02G 3/04 | (2006.01) |
| G03B 27/52 | (2006.01) |

(52) U.S. Cl. ........ 358/498; 358/474; 358/296; 358/448; 358/537; 358/505; 399/367; 399/374; 399/39; 271/225; 271/3.14; 271/65; 174/68.1; 355/24

(58) Field of Classification Search ................. 358/498, 358/296, 448, 505; 399/367, 374, 39; 174/68.1; 355/24; 271/265.01, 65
See application file for complete search history.

(56) References Cited

U.S. PATENT DOCUMENTS

| | | | | |
|---|---|---|---|---|
| 6,354,589 | B1 * | 3/2002 | Taruki et al. | 271/265.01 |
| 2006/0062615 | A1 * | 3/2006 | Horio | 399/374 |
| 2007/0146833 | A1 * | 6/2007 | Satomi et al. | 358/537 |
| 2009/0251744 | A1 * | 10/2009 | Tokutsu | 358/498 |

* cited by examiner

*Primary Examiner* — Charlotte M Baker
*Assistant Examiner* — Rury Grisham
(74) *Attorney, Agent, or Firm* — Staas & Halsey LLP

(57) ABSTRACT

An image scanning method of an image scanning device, the method including: feeding multiply fed documents in a first path and scanning, by a scanning unit of the image scanning device, a first document of the multiply fed documents; outputting the first document through an exit unit; reversely driving the exit unit after the first document is output to reversely feed a second document of the multiply fed documents in a second path, and scanning the second document; and forming images of the first document and the second document, wherein the second path is used to reversely feed the second document to an upstream side of the scanning unit, in view of a feeding direction of the multiply fed documents.

23 Claims, 11 Drawing Sheets

MULTIPLE FEEDING PREVENTING APPARATUS AND IMAGE FORMING DEVICE INCLUDING THE SAME AND IMAGE FORMING METHOD

CROSS-REFERENCE TO RELATED APPLICATION

This application claims the benefit of Korean Patent Application No. 10-2008-0110497, filed Nov. 7, 2008 in the Korean Intellectual Property Office, the disclosure of which is incorporated herein by reference.

BACKGROUND OF THE INVENTION

1. Field of the Invention

Aspects of the present invention relate to a method and apparatus for scanning each of a plurality of sheets one by one in order to capture an image of each of the plurality of sheets, without multiple feeding of the sheets and an image forming device and method including the same.

2. Description of the Related Art

When documents are multiply fed in a scanning device (such as a multi-function printer, a scanner, a copy machine, etc.), conventional duplex automatic document feeders (DADFs) do not detect the multiple feeding and scan the multiply fed document. Thus, when a plurality of documents are multiply fed, a user has difficulty in determining if the documents have been multiply fed. Moreover, even when the user determines that the documents have been multiply fed, the user must re-feed the documents and rescan the documents.

A retard roller is used to prevent documents from being multiply fed. Specifically, a feeding roller that feeds sheets stored in a document storage case by using a pick-up roller and rotates in a feeding direction. The retard roller rotates in a reverse direction and is used to separate a plurality of documents. When a sheet of paper is fed, the retard roller does not reversely rotate due to a torque limiter. However, when two or more sheets of paper are fed (i.e., when a document or a paper is multiply fed), since a friction coefficient between the retard roller and the sheets is greater than a friction coefficient between the sheets, the retard roller reversely rotates and separates the sheets.

However, the retard roller, the pick-up roller, and the feeding roller are additionally required to prevent the documents from being multiply fed. Furthermore, a controller to control the coupling pressure between the feeding roller and the retard roller and the torque of the retard roller is additionally required. Moreover, the retard roller does not fully prevent documents or papers from being multiply fed.

Therefore, an apparatus and method to detect multiple feeding of documents and scanning the documents one by one, irrespective of a device such as the retard roller and the torque limiter, are required.

SUMMARY OF THE INVENTION

Aspects of the present invention provide an apparatus and method to detect a multiple feeding of a plurality of sheets and scanning the sheets one by one, irrespective of a device, such as a retard roller or a torque limiter. That is, aspects of the present invention provide an apparatus and method to detect multiple feeding of documents by using a simple device or method. Furthermore, aspects of the present invention provide an apparatus and method to output a scanned image of a first document by removing a part of an image of a second document that is included in the scanned image of the first document among a plurality of multiply fed documents.

According to an aspect of the present invention, there is provided an image scanning method of an image scanning device, the image scanning method including: feeding multiply fed documents in a first path and scanning, by the scanning unit, a first document of the multiply fed documents; outputting the first document through an exit unit of the image scanning device; reversely driving the exit unit after the first document is output to reversely feed a second document of the multiply fed documents in a second path, and scanning the second document; and forming images of the first document and the second document, wherein the second path is used to reversely feed the second document to an upstream side of the scanning unit, in view of a feeding direction of the multiply fed documents.

According to an aspect of the present invention, the method may further include: when at least a part of a scanned image of the second document is included in a scanned image of the first document, removing the at least part of the scanned image of the second document from the scanned image of the first document.

According to an aspect of the present invention, the method may further include: comparing a spaced distance between the multiply fed first and second documents with a minimum distance used for reverse feeding of the exit unit.

According to an aspect of the present invention, the exit unit may be reversely driven if the spaced distance is greater than or equal to the minimum distance.

According to an aspect of the present invention, the scanning unit may include first and second scanning units to scan the multiply fed documents, wherein the first scanning unit scans the first document, and the second scanning unit scans the second document that is reversely fed in the second path.

According to an aspect of the present invention, the first scanning unit and the second scanning unit may be disposed above and below the first path.

According to an aspect of the present invention, the first scanning unit and/or the second scanning unit may include a charge-coupled device (CCD) and/or a contact image sensor (CIS).

According to an aspect of the present invention, the second document may be scanned after having been reversely fed twice in the second path.

According to an aspect of the present invention, the second path may be a duplex feeding path used to scan both sides of the multiply fed documents.

According to an aspect of the present invention, the spaced distance may be determined according to a feeding speed of the multiply fed documents and according to a difference between a time when a sensor of the image scanning device detects the first document and a time when the sensor detects the second document.

According to an aspect of the present invention, the sensor may determine whether the documents are multiply fed according to a change in a difference of a distance between the sensor and the documents while the documents pass the sensor.

According to an aspect of the present invention, the minimum distance may be determined according to a size of the exit unit, a pressure applied to the exit unit, and/or a hardness of the exit unit.

According to another aspect of the present invention, there is provided an image scanning device including: a scanning unit to scan a plurality of documents; a first feeding unit disposed on a first path used to feed the documents; an exit unit to output the documents; and a second feeding unit to feed the documents and being disposed on a second path, wherein the second path is used to feed the documents in an upstream side of the scanning unit in view of a feeding direction of the documents, when the documents are multiply fed through the first feeding unit in the first path, the reading unit scans a first document of the multiply fed documents, the exit unit is reversely driven after the exit unit outputs the first document so that the second feeding unit reversely feeds a second document of the multiply fed documents, and the scanning unit scans the second document.

According to an aspect of the present invention, the device may further include a controller, when at least a part of a scanned image of the second document is included in a scanned image of the first document, removing the at least part of the scanned image of the second document from the scanned image of the first document.

According to an aspect of the present invention, the controller may compare a spaced distance between the multiply fed first and second documents with a minimum distance used for reverse feeding of the exit unit.

According to an aspect of the present invention, the controller may reversely drive the exit unit if the spaced distance is greater than or equal to the minimum distance.

According to an aspect of the present invention, the scanning unit may include first and second scanning units, wherein the first scanning unit scans the first document, and the second scanning unit scans the second document that is reversely fed in the second path.

According to an aspect of the present invention, the first scanning unit and the second scanning unit may be disposed in above and below, respectively, the first path.

According to an aspect of the present invention, the first scanning unit an/or the second scanning unit may include a CCD and/or a CIS.

According to an aspect of the present invention, the second document may be scanned after having been reversely fed twice in the second path.

According to an aspect of the present invention, the second path may be a duplex feeding path used to scan both sides of the multiply fed documents.

According to an aspect of the present invention, the spaced distance may be determined according to a feeding speed of the multiply fed documents and according to a difference between a time when a sensor detects the first document and a time when the sensor detects the second document.

According to an aspect of the present invention, the sensor may determine whether the documents are multiply fed according to a change in a difference of a distance between the sensor and the documents.

According to an aspect of the present invention, the minimum distance may be determined according to a size of the exit unit, a pressure applied to the exit unit, and/or a hardness of the exit unit.

According to another aspect of the present invention, there is provided an image scanning method of an image scanning device, the method including: when a plurality of documents are multiply fed, feeding the multiply fed documents in a path and scanning, by a scanning unit of the device, a first document of the multiply fed documents; outputting the first document through an exit unit of the image scanning device; reversely driving the exit unit after the first document is output, reversely feeding a second document of the multiply fed documents toward an upstream side of the scanning unit in view of a feeding direction of the multiply fed documents, and scanning the second document; and forming images of the first document and the second document.

According to an aspect of the present invention, the method may further include when at least a part of a scanned image of the second document is included in a scanned image of the first document, removing the at least part of the scanned image of the second document from the scanned image of the first document.

According to an aspect of the present invention, the method may further include comparing a spaced distance between the multiply fed first and second documents with a minimum distance used for reverse feeding of the exit unit.

According to an aspect of the present invention, the exit unit may be reversely driven if the spaced distance is greater than or equal to the minimum distance.

According to an aspect of the present invention, the scanning unit may be disposed above or below a point where the multiply fed documents are scanned on the feeding path.

According to an aspect of the present invention, the scanning unit may include a CCD and/or a CIS.

According to an aspect of the present invention, the spaced distance may be determined according to a feeding speed of the multiply fed documents and a difference between a time when a sensor detects the first document and a time when the sensor detects the second document.

According to an aspect of the present invention, the sensor may determine whether the documents are multiply fed according to a change in a difference of a distance between the sensor and the documents.

According to an aspect of the present invention, the minimum distance may be determined according a size of the exit unit, a pressure applied to the exit unit, and/or a hardness of the exit unit.

According to yet another aspect of the present invention, there is provided an image scanning device including: a scanning unit to scan a plurality of documents; a feeding unit disposed on a feeding path used to feed the documents; and an exit unit to output the documents, wherein when the documents are multiply fed through the first feeding unit in the first path, the scanning unit scans a first document of the multiply fed documents through the feeding unit disposed on the feeding path, the exit unit is reversely driven after the exit unit outputs the first document so as to reversely feed a second document of the multiply fed documents toward an upstream side of the scanning unit in view of the feeding unit of the multiply fed documents in the feeding path, and the scanning unit scans the second document.

According to an aspect of the present invention, the device may further include a controller, when at least a part of a scanned image of the second document is included in a scanned image of the first document, removing the at least part of the scanned image of the second document from the scanned image of the first document.

According to an aspect of the present invention, the controller may compare a spaced distance between the multiply fed first and second documents with a minimum distance used for reverse feeding of the exit unit.

According to an aspect of the present invention, the controller may reversely drive the exit unit if the spaced distance is greater than or equal to the minimum distance.

According to an aspect of the present invention, the scanning unit may be disposed above or below the feeding path.

According to an aspect of the present invention, the scanning unit may include a CCD and/or a CIS.

According to an aspect of the present invention, the spaced distance may be determined according to a feeding speed of the multiply fed documents and according to a difference between a time when a sensor detects the first document and a time when the sensor detects the second document.

According to an aspect of the present invention, the sensor may determine whether the documents are multiply fed according to a change in a difference of a distance between the sensor and the documents.

According to an aspect of the present invention, the minimum distance may be determined according to a size of the exit unit, a pressure applied to the exit unit, and/or a hardness of the exit unit.

According to still another aspect of the present invention, there is provided a document outputting method of a document outputting device including a feeding unit, the method including: determining whether the feeding unit multiply feeds documents in a first path; outputting a first document of the fed documents through an exit unit of the document outputting device; and when the feeding unit is determined to multiply feed the documents, controlling the exit unit to reversely feed a second document of the multiply fed documents to an upstream side of the first path, in view of a feeding direction of the multiply fed documents, after the first document is output.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
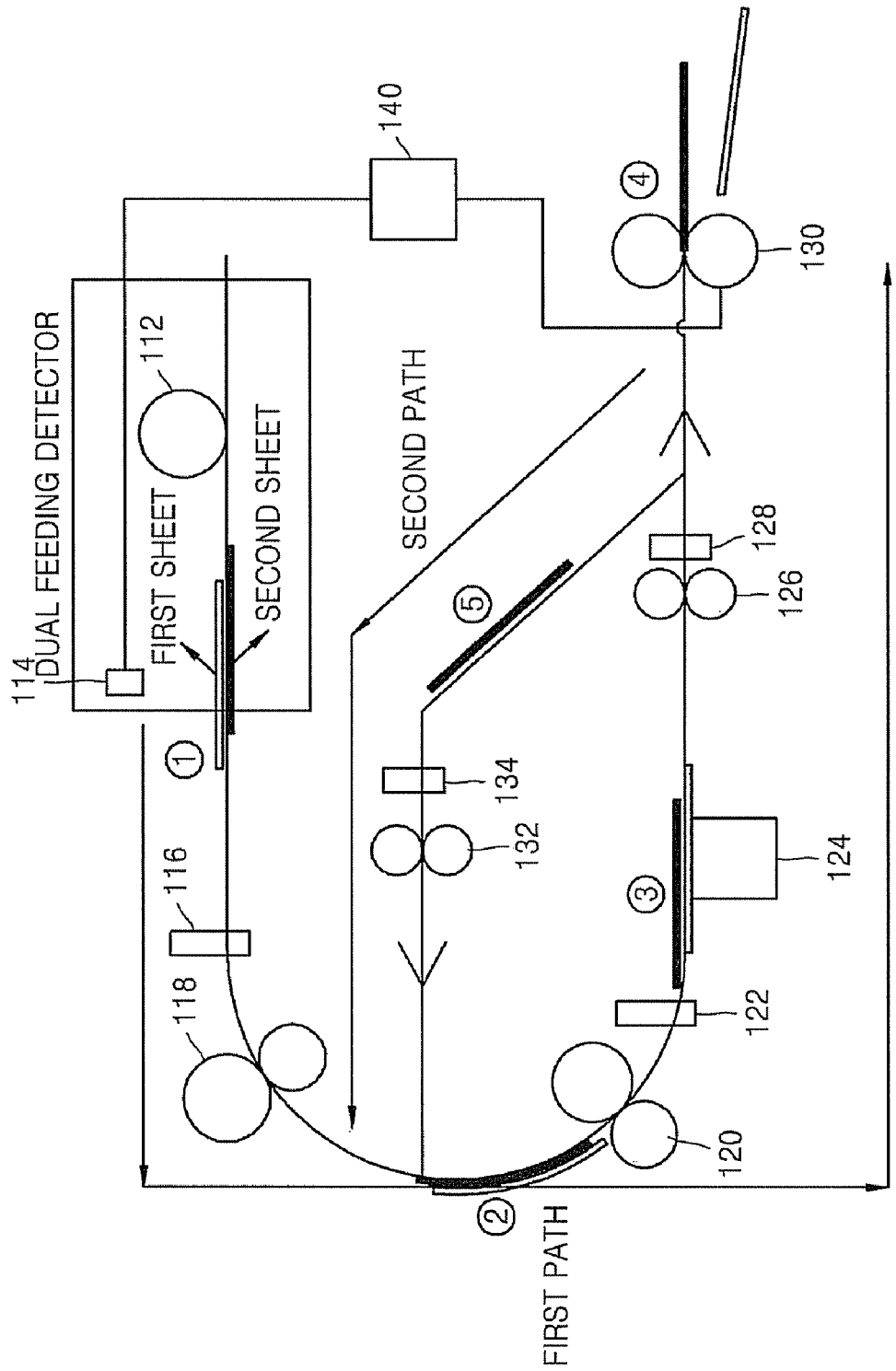
FIGS. 1 and 2 are diagrams of a scanning unit of an image forming device and two sheets feeding paths according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
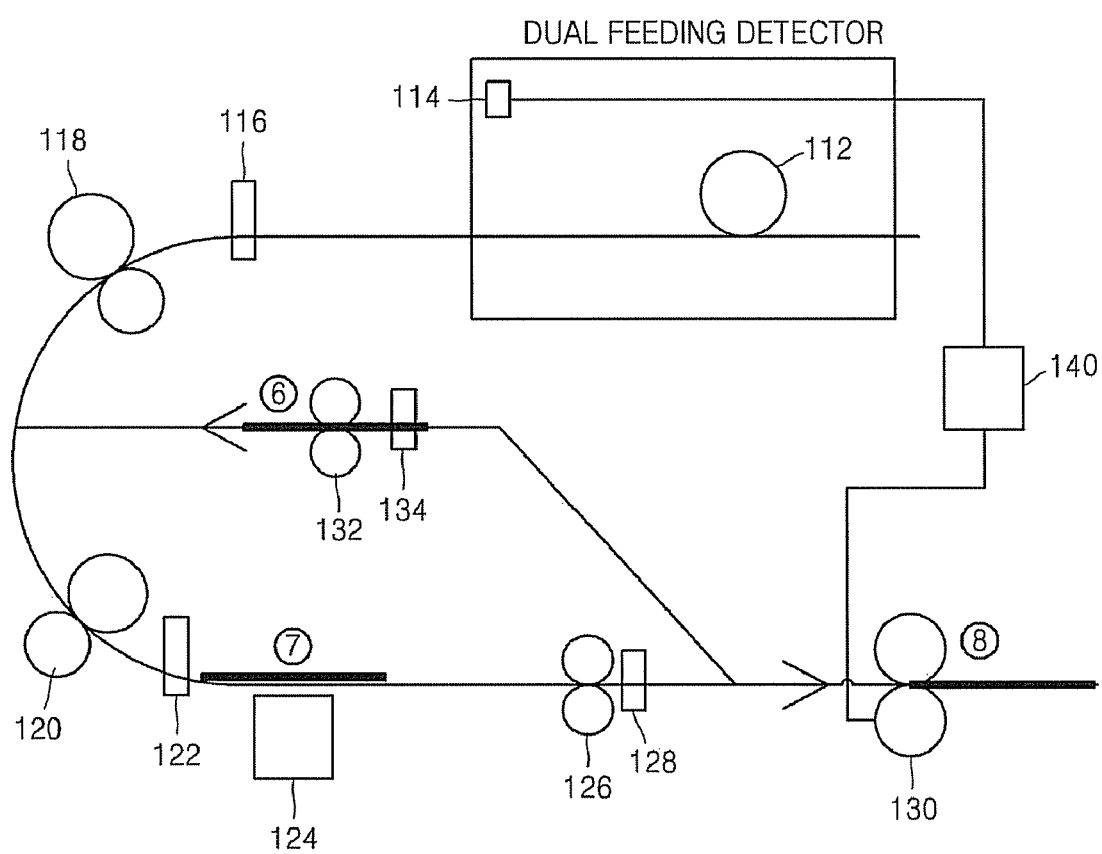

FIGS. 1 and 2 are diagrams of a scanning unit of an image forming device (such as a scanner, a copier, or a multi-function device) and two sheets feeding paths according to an embodiment of the present invention. Referring to FIG. 1, a document scanning path includes a first path in which a plurality of documents (i.e., sheets of paper, transparencies, envelopes, etc.) move through a feeding roller 112, a ledge roller 118, a scan roller 120, a scan module 124, and an exit roller 130. Furthermore, the document scanning path also includes a second path in which the documents that are reversely fed through the exit roller 130 move through a duplex roller 132 toward an upstream side of the scan module 124 in view of a document feeding direction. A duplex sensor 134 detects whether a document (such as a paper, a transparency, an envelope, etc.) is reversely fed via the second path, such that if the document is reversely fed via the second path, the duplex sensor 134 scans the rear side of the document.

A document scanning process via the first path will now be described in more detail. If a user places the documents on a document storage case (or a document feeder) and executes a scan or copy command in order to scan the documents, the documents are fed from the document storage case to the feeding roller 112 (1 in FIG. 1). A ledge sensor 116 detects an arrangement state of the documents before the documents pass through the ledge roller 118. If the ledge sensor 116 detects that the documents are not orderly arranged, the ledge roller 118 does not rotate so that the documents are not fed any more and can be orderly arranged by alerting the user to fix the documents. Thereafter, the ledge roller 118 rotates so that the documents are fed to the scan roller 120 (2 in FIG. 1). The scan module 124 scans the documents to capture images thereof (3 in FIG. 1). A scan sensor 122 is additionally installed on the upstream side of the scan module 124 in view of the document feeding direction, though all aspects are not limited thereto. In this case, the scan sensor 124 notifies a controller 140 of the image forming device that the documents enter the scan module 124. The documents that have been scanned by the scan module 124 are output through the exit roller 130. The scan module 124, which optically scans an original image such as a printout, converts the original image into a digital image (such as a PDF, TIFF, or other digital format). For example, the scan module 124 may use a charge-coupled device (CCD), a contact image sensor (CIS), and/or a photomultiplier tube as an image sensor.

Hereinafter, a process of scanning or copying the documents will now be described when the documents are multiply fed (e.g., two sheets at once) from the document storage case through the feeding roller 112. A detection sensor 114 to detect the multiple feeding of the documents is provided between the feeding roller 112 and the ledge roller 118. When the detection sensor 114 detects multiple feeding of the documents, the detection sensor 114 generates a signal to inform the controller 140 of the image forming device about the multiple feeding of the documents. While not required in all aspects, the controller 140 can include a processor or microprocessor executing a computer program stored in a computer-readable medium, such as a storage unit (not shown) of the image forming device.

Figure 5A:
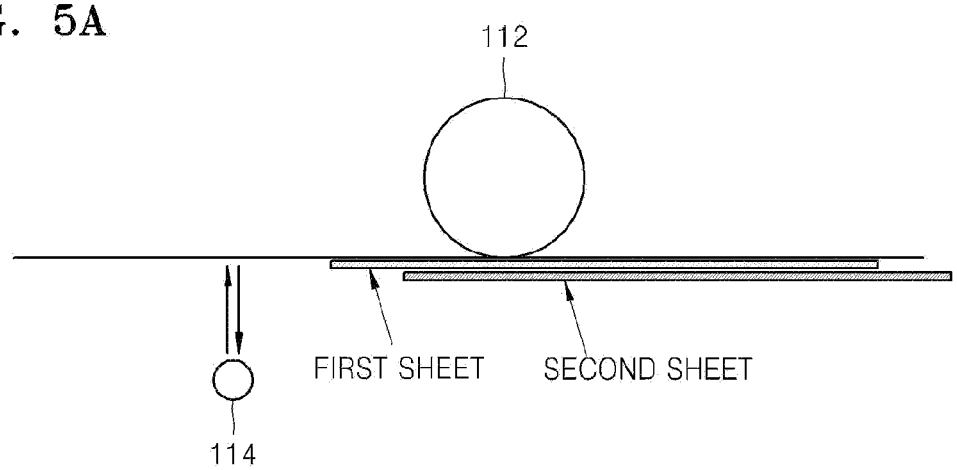
FIGS. 5A through 5C are diagrams to explain multiple feeding of documents detected by a detection sensor according to an embodiment of the present invention.
Figure 5B:
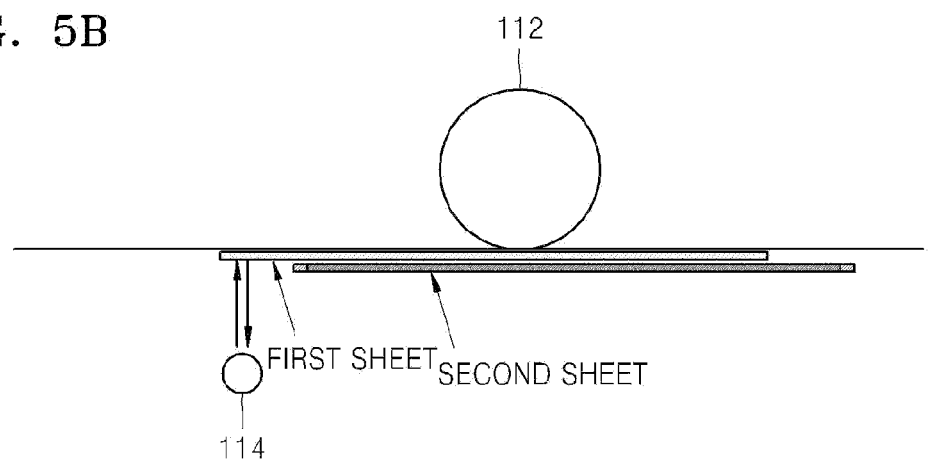
Figure 5C:
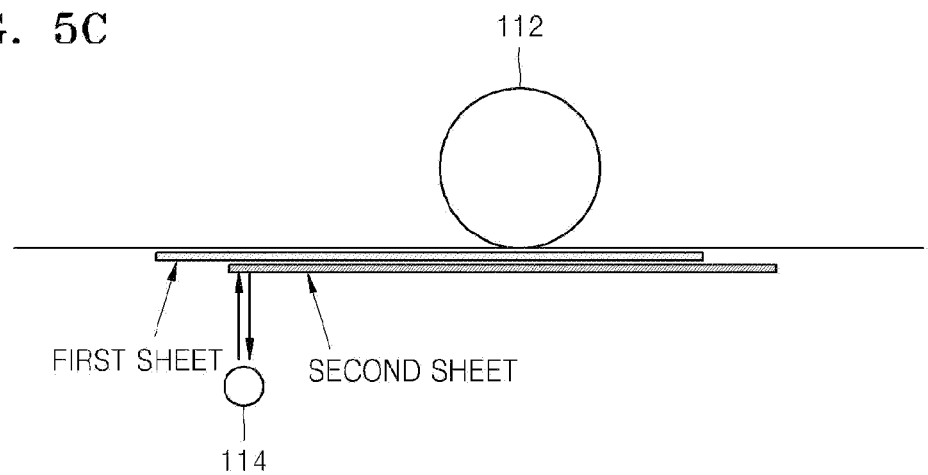

FIGS. 5A through 5C are diagrams to explain multiple feeding of documents detected by the detection sensor 114 according to an embodiment of the present invention. Referring to FIG. 5A, when two sheets of documents are multiply fed, a document placed on a relatively downstream side is a first document (first sheet), and a document placed on a relatively upstream side is a second document (second sheet) in view of the document feeding direction. For example, when the first and second documents that are spaced from each other by a predetermined distance pass the detection sensor 114 (for example, if the detection sensor 114 is located below the feeding path, when the first and second documents pass above the detection sensor 114), the detection sensor 114 detects a distance H1 between the first document and the detection sensor 114 when the first document is fed as in FIG. 5B, and a distance H2 between the second document and the detection sensor 114 when the second document moves as the first document is fed as shown in FIG. 5C. Therefore, the detection sensor 114 detects the multiple feeding of the first and second documents due to a difference between the distances H1 and H2 ($\Delta H = H1 - H2$).

Although the detection sensor 114 detects the multiple feeding of the first and second documents due to the difference between the distances H1 and H2 in the shown embodiment, a variety of methods of detecting the multiple feeding of documents that are known to one of ordinary skill in the art may be applied to the present invention. Also, a spaced distance X between the first and second documents may be obtained by a distance $\Delta T$ between a time T1 when the first document is detected and a time T2 when the second document is detected and a feeding speed V of the first and second documents. The spaced distance X is related to a minimum distance S, which will be described later, and is used by the exit roller 130 to reversely feed the second document.

Referring back to FIGS. 1 and 2, the multiply fed documents are detected by the detection sensor 114 and enter into the scan module 124 through the ledge roller 118 and the scan roller 120 (1 through 3 in FIG. 1). Although the scan module 124 is disposed in a downstream direction of the first path in FIG. 1, it is understood that aspects of the present invention are not limited thereto. For example, the scan module 124 may be disposed in an upstream direction of the first path according to a feeding direction of the first and second documents. The first document is scanned by the scan module 124 and is output through the exit roller 130 (4 in FIG. 1). A gate roller 126 and a gate sensor 128 are additionally disposed between the scan module 124 and the exit roller 130 in the illustrated embodiment, though all embodiments are not limited thereto.

When the first document is output through the exit roller 130 (4 in FIG. 1), the second document that is disposed on an upstream side of the first document by a predetermined spaced distance is not wholly output due to the engagement of nip portions of the exit roller 130, and is reversely fed by a reverse driving of the exit roller 130 (5 in FIG. 1). The reversely fed second document moves along the second path by the control of the gate roller 126 and the gate sensor 128 disposed at a point where the first and second paths diverge toward the upstream side of the scan module 124 in view of the document feeding direction. The first and second documents may move in the second path by using a document guide that guides the document feeding direction, such as a flapper, in addition to the gate roller 126 and the gate sensor 128. The second document that moves toward the upstream side of the scan module 124 (6 in FIG. 2) is not scanned through the scan module 124 since a scanned side of the second document does not face the scan module 124 (i.e., when the second document passes the scan module 124, the scanned side is facing the duplex roller 132). Therefore, the second document moves toward the upstream side of the scan module 124 again along the second path by another reverse driving of the exit roller 130 (5 in FIGS. 1 and 6 in FIG. 2), is scanned by the scan module 124 (7 in FIG. 2), and is output through the exit roller 130 (8 in FIG. 2).

Figure 6:
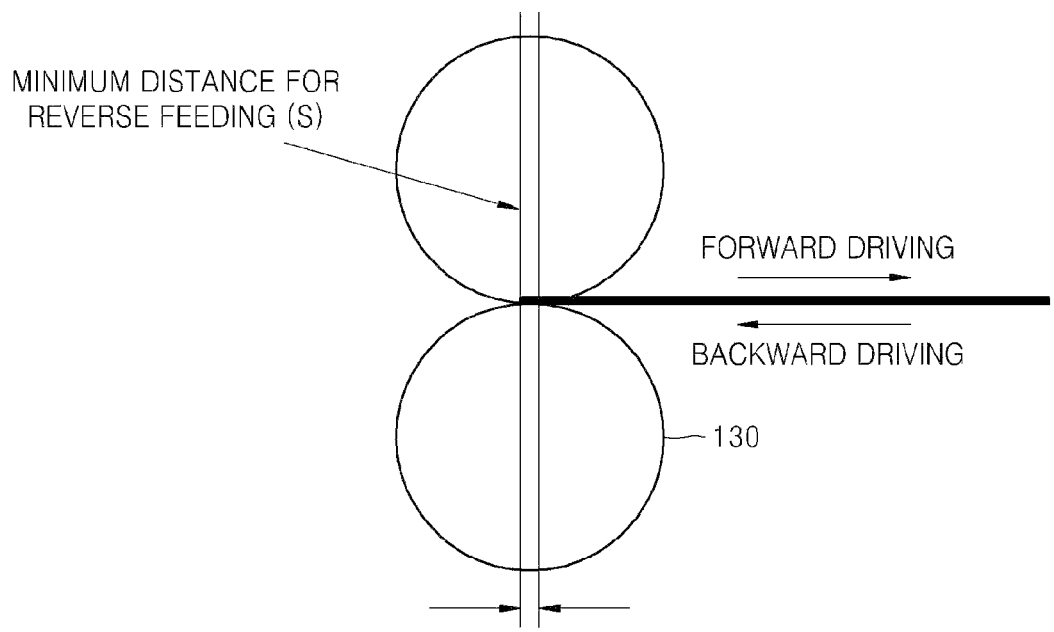
FIG. 6 is a diagram to explain a minimum distance used by an exit roller to reversely feed documents according to an embodiment of the present invention.

FIG. 6 is a diagram to explain the minimum distance S used by the exit roller 130 to reversely feed the documents according to an embodiment of the present invention. The minimum distance S is a distance used by the exit roller 130 to reversely feed the multiply fed documents in a lengthwise direction. Referring to FIG. 6, when the spaced distance X between the multiply fed first and second documents is greater than or equal to the minimum distance S, since the second document is engaged by the exit roller 130 by a length greater than the minimum distance S used to reversely feed the second document when the exit roller 130 outputs the first document, the second document is reversely fed. When the spaced distance X is less than the minimum distance S, since the second document is not sufficiently engaged by the exit roller 130 when the exit roller 130 outputs the first document, the second document is not reversely fed so that the exit roller 130 outputs the first and second documents together. In this case, a user manually puts the second document in the document storage case (or document feeder) in order to scan the second document according to a process described above. Furthermore, the controller 140 of the image forming device may receive information about the spaced distance X from the detection sensor 114 to detect the multiple feeding of the first and second documents, compare the information with the minimum distance S, and determine whether to reversely drive the exit roller 130. While not required, if the detector sensor 114 indicates a multiple fed document but the minimum distance S is greater than the spaced distance X, the controller 140 might indicate a feed error to the user as the second document was likely not scanned.

Meanwhile, the minimum distance S varies according to embodiments of the present invention (for example, according to the size and characteristics of the exit roller 130). Specifically, the greater the diameter of the exit roller 130 and the more the pressure (on the nip portions) applied to the exit roller 130 increases, the more the area of the exit roller 130 contacting the documents increases, so that the minimum distance S increases. Also, if the hardness of the exit roller 130 increases, although the same diameter and pressure are applied to the exit roller 130, since the area of the exit roller 130 contacting the documents increases, the minimum distance S decreases. For example, if the diameter of the exit roller 130 is 15 mm, pressure of 3.0 kg/f is applied to the exit roller 1330, and the hardness of the exit roller 130 is 70, the minimum distance S may be 9 mm.

Even if the documents multiply fed in the second path are all scanned in FIGS. 1 and 2, the second path may also be used as a duplex scan path in order to scan both sides of the documents.

Meanwhile, when the multiply fed documents are scanned or copied as shown in FIGS. 1 and 2, the second document that overlaps the first document may be scanned when the first document (first sheet) is scanned. In more detail, since at least a part of the image of the second document may be included in a scanned image of the first document, the at least partial image of the second document included in the scanned image of the first document is removed. In this regard, a method of determining a scanned image of the second document or a pattern thereof and removing a part related to the image of the second document from the scanned image of the first document may be considered. For example, when a rear image overlaps a front image, since it is possible to compare and analyze the scanned images of the first and second documents by using an operation of removing the overlapped image (a show through removal (STR) operation), it is possible to remove at least a part of the image of the second document from the scanned image of the first document by comparing next images.

Figure 10:
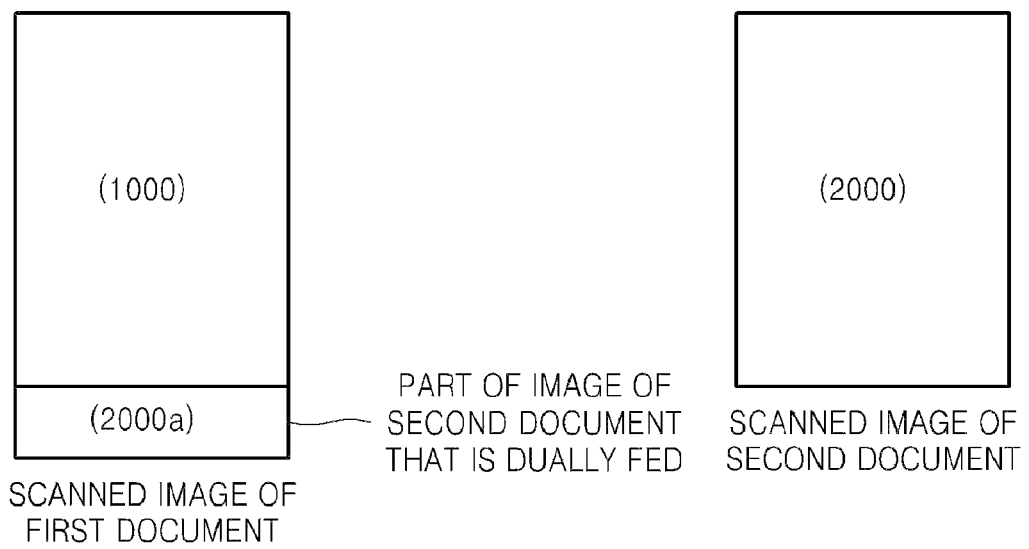
FIG. 10 is a diagram to explain a method of removing a part of an image of a second document from a scanned image of a first image according to an embodiment of the present invention.

Furthermore, in addition to the case where a part of the image of the second document is included in the scanned image of the first document, a part 2000a of the second document corresponding to a distance spaced apart X from the first document may be included in the scanned image of the first document as shown in FIG. 10. In this case, a part where two images of the first and second documents are different from each other is determined as a scanned image 1000 of the first document, and the part 2000a of the scanned image of the second document is removed from the scanned image 1000 of the first document.

Figure 3:
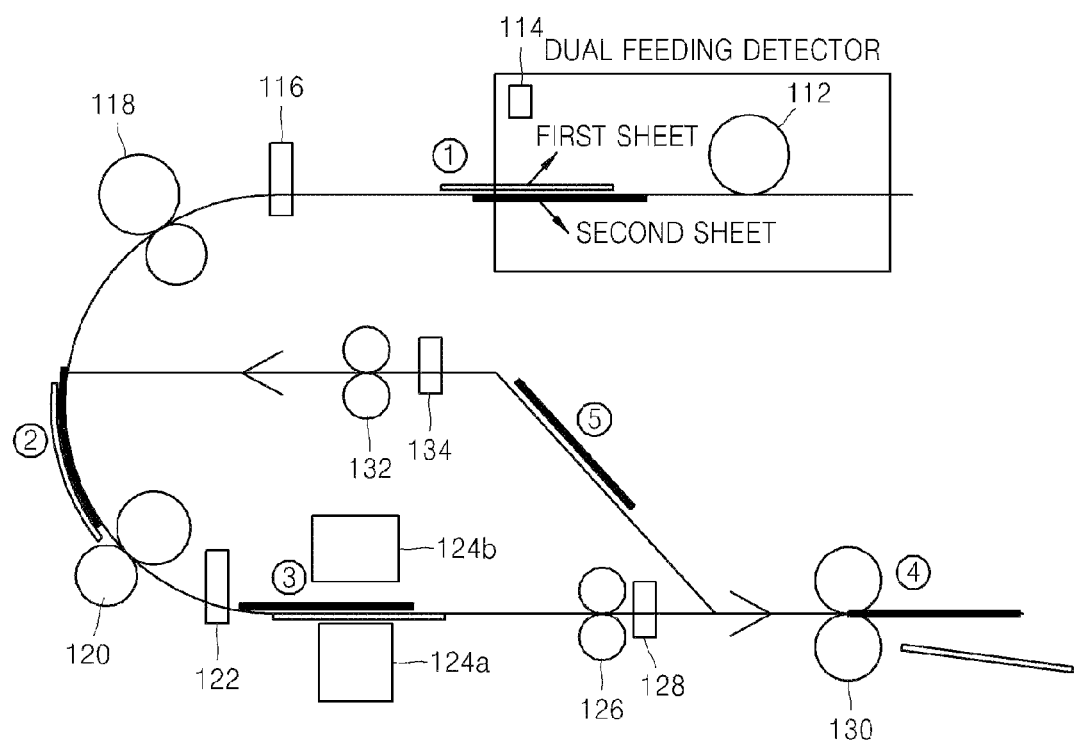
FIGS. 3 and 4 are diagrams of a scan module disposed in upper and lower directions of a first path, respectively, according to an embodiment of the present invention.
Figure 4:
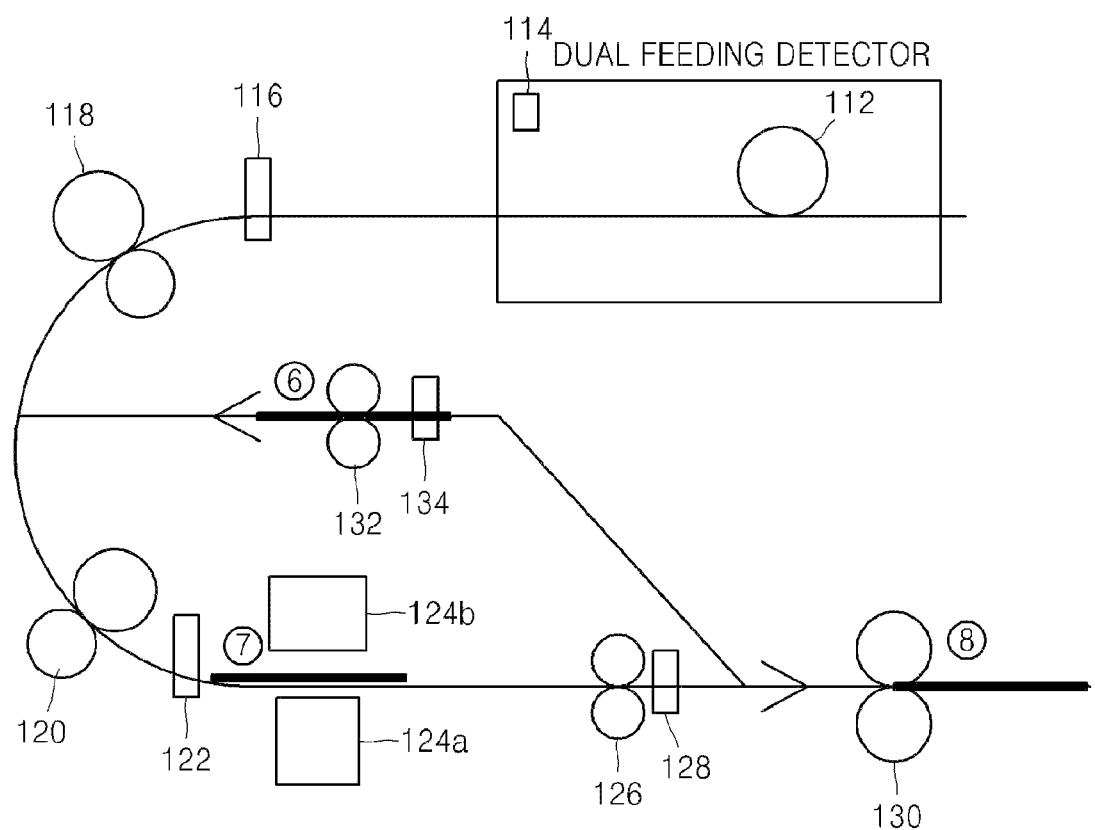

FIGS. 3 and 4 are diagrams of the scan module 124 disposed in an upper direction 124b and a lower direction 124a of the first path according to an embodiment of the present invention. Unlike FIGS. 1 and 2 illustrating an embodiment where the scan module 124 is disposed in one direction of the first path, the scan module 124 is disposed in the upper direction 124b and the lower direction 124a of the first path in FIGS. 3 and 4. Although the second document moves twice in the second path so that the scan module 124 scans the second document in FIGS. 1 and 2, the second document may move once in the second path so that the scan module 124 disposed in the upper direction 124b can scan the second document. The description of the apparatus and method shown in FIGS. 3 and 4 is similar to that described with reference to FIGS. 1 and 2 and thus the description will not be repeated here.

Figure 7:
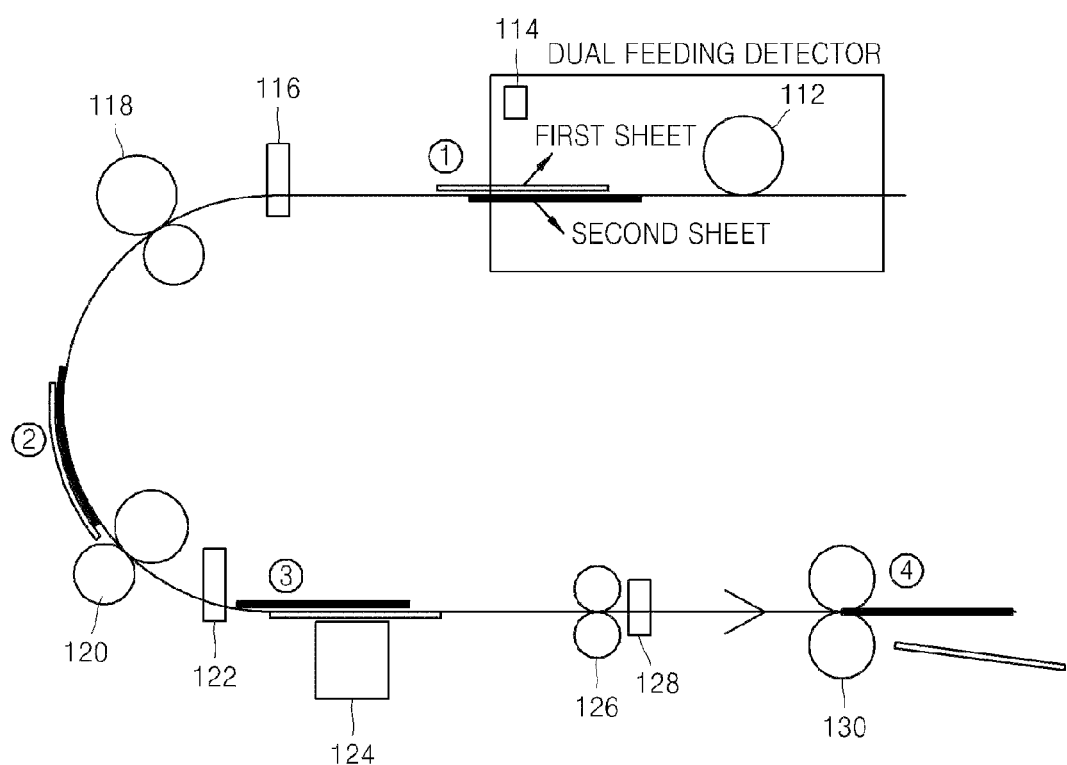
FIGS. 7 and 8 are diagrams of a single feeding path according to an embodiment of the present invention.
Figure 8:
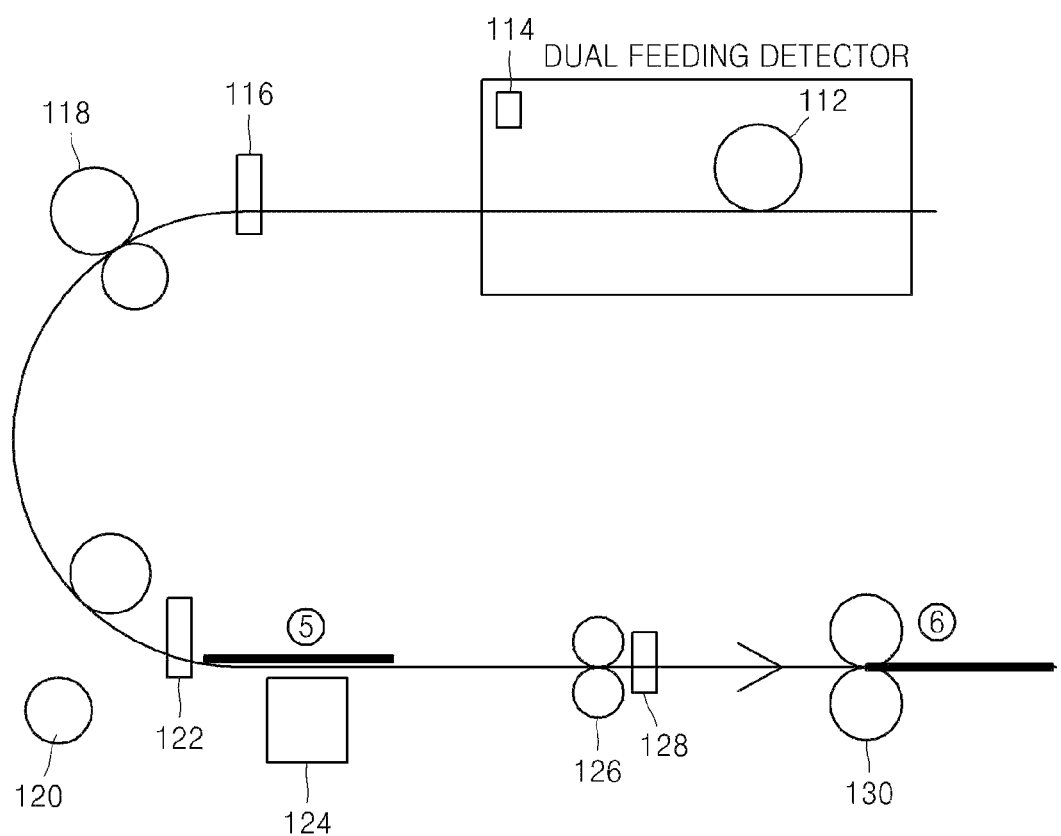

FIGS. 7 and 8 are diagrams of a single feeding path according to an embodiment of the present invention. Unlike FIGS. 1 through 4, the multiply fed first and second documents are scanned via a single feeding path. Referring to FIGS. 7 and 8, when the first document is output through the exit roller 130, the second document disposed in the upstream side of the first document by at least the predetermined spaced distance is not output, reversely moves toward the upstream side of the scan module 124 via the single feeding path by the reverse driving of the exit roller 130, moves to the scan module 124, and is scanned by the scan module 124. The description of the apparatus and method shown in FIGS. 7 and 8 is similar to that described with reference to FIGS. 1 and 2 and thus the description will not be repeated here.

Figure 9A:
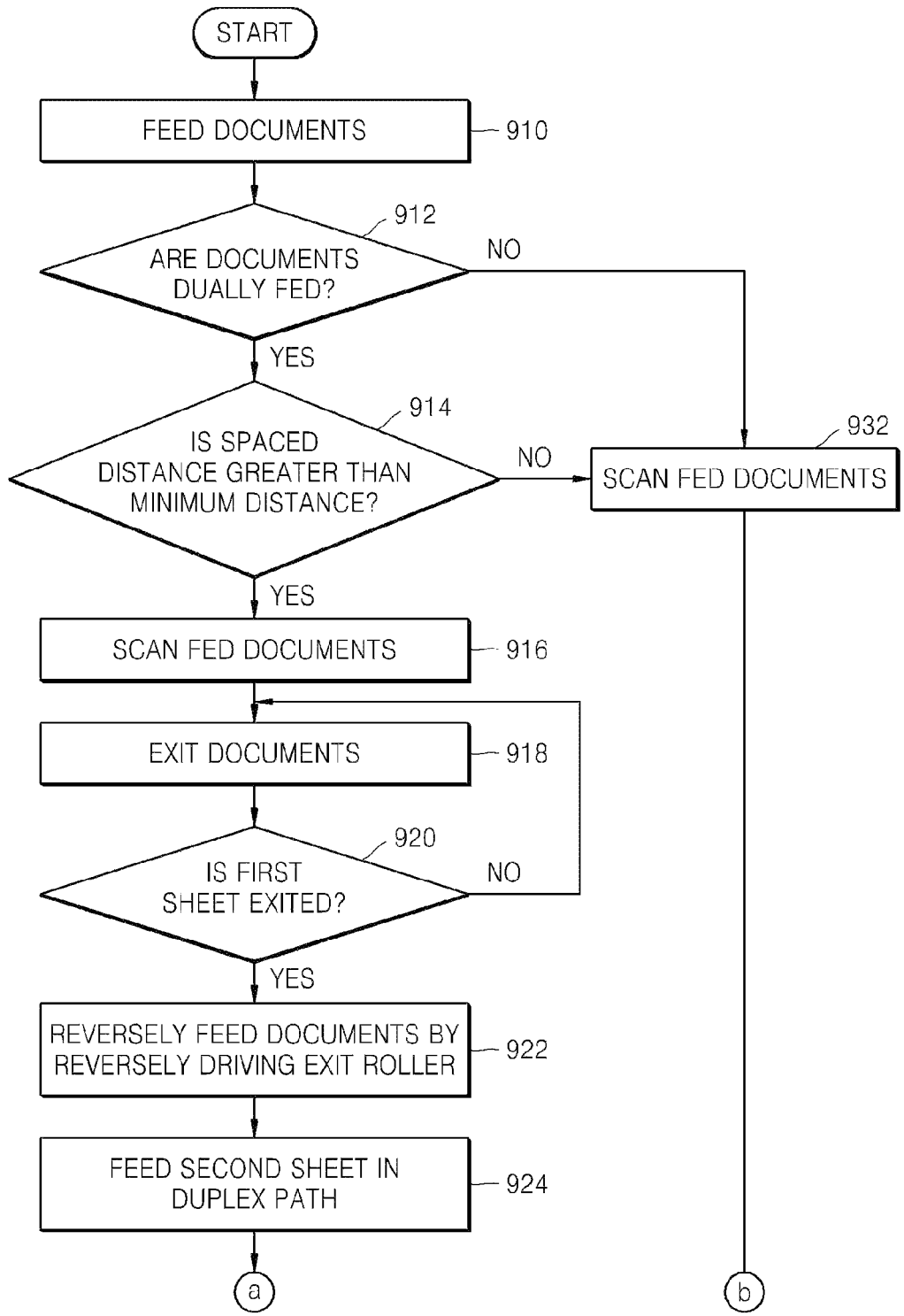
FIGS. 9A and 9B are flowcharts illustrating a method of scanning or copying multiply fed documents according to an embodiment of the present invention.
Figure 9B:
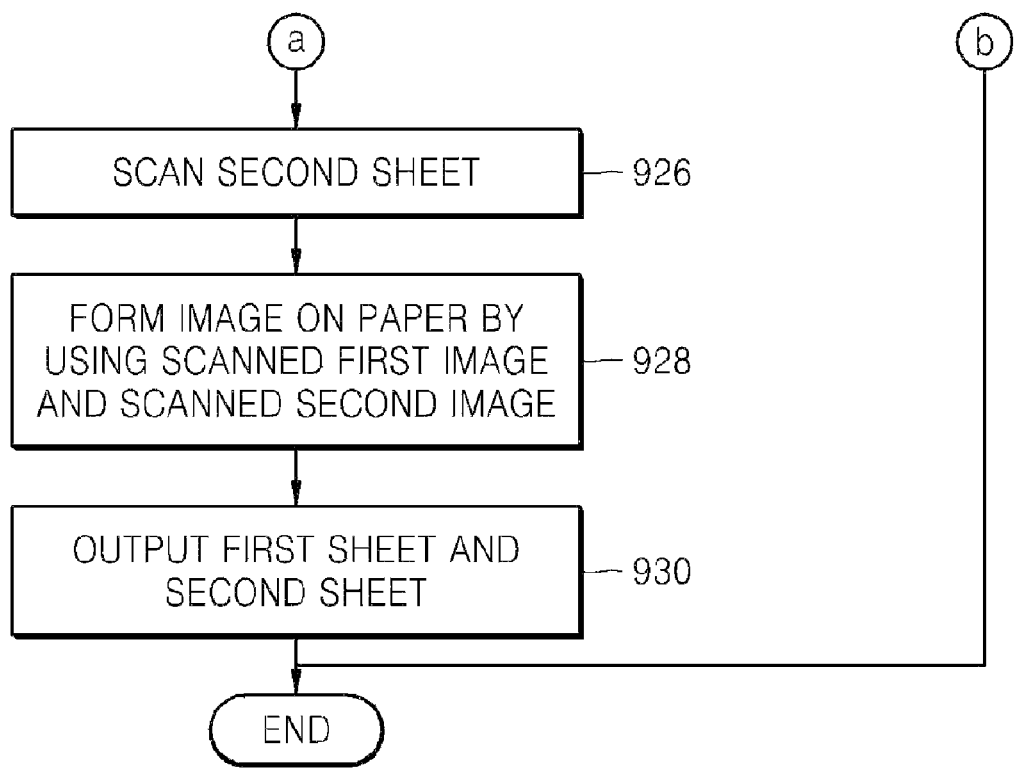

FIGS. 9A and 9B are flowcharts illustrating a method of scanning or copying multiply fed documents according to an embodiment of the present invention. Referring to FIGS. 9A and 9B, in operation 910, a plurality of documents are fed into an image forming device. In operation 912, it is determined whether the documents are multiply fed during a document feeding process. If it is determined that the documents are multiply fed (operation 912), the image forming device determines whether a spaced distance X between multiply fed first and second documents (i.e., first and second sheets) is greater than a minimum distance S in operation 914. If the image forming device determines that the spaced distance X is greater than the minimum distance S (operation 914), the image forming device scans the fed documents in operation 916 and outputs the scanned documents in operation 918.

In operation 920, the image forming device determines whether the first document is output. If the image forming device determines that the first document is not output (operation 920), operation 918 is performed until the image forming device determines that the first sheet is output in operation 920. Meanwhile, if the image forming device determines that the first document is output (operation 920), the image forming device reversely drives an exit roller (i.e., performs reverse feeding) in operation 922, and feeds the second document along a duplex path in operation 924. Accordingly, the image forming device scans the second document in operation 926, forms an image on one or more sheets of print media by using the scanned image of the first document and the scanned image of the second document in operation 928, and outputs the one or more sheets of print media on which the image is formed in operation 930.

If the image forming device determines that the documents are not multiply fed (operation 912) or the spaced distance X is smaller than the minimum distance S (operation 914), the image forming device scans the fed document in operation 932.

While described in the context of an image forming device, it is understood that aspects of the invention can be used in apparatuses that do not print data, such as scanners.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image scanning method of an image scanning device including a scanning unit, the image scanning method comprising:
    simultaneously feeding documents in a first path and scanning, by the scanning unit, a first document of the simultaneously fed documents, wherein the simultaneously fed documents are stacked such that the first document is between the scanning unit and a second document, of the simultaneously fed documents, when the first document is scanned;
    outputting the first document through an exit unit of the image scanning device; and
    reversely driving the exit unit after the first document is output to reversely feed the second document in a second path, and scanning, by the scanning unit, the second document,
    comparing a spaced distance between the first and second documents with a predetermined minimum distance used to reversely drive the exit unit,
    wherein the second path is used to reversely feed the second document to an upstream side of the scanning unit, in view of a feeding direction of the simultaneously fed documents.

2. The method as claimed in claim 1, further comprising:
    forming a first electronic image of the scanned first document and a second electronic image of the scanned second document.

3. The method as claimed in claim 2, further comprising:
    when at least a part of the second electronic image of the second document is included in the first electronic image of the first document, removing the at least part of the second electronic image of the second document from the first electronic image of the first document.

4. The method as claimed in claim 1, wherein the reversely driving of the exit unit comprises reversely driving the exit unit when the spaced distance is equal to or greater than the predetermined minimum distance, and not reversely driving the exit unit when the spaced distance is less than the predetermined distance.

5. The method as claimed in claim 1, wherein:
    the scanning unit comprises a first scanning unit and a second scanning unit to scan the simultaneously fed documents, the first scanning unit and the second scanning unit are respectively disposed at opposite sides of the first path; and
    wherein the first scanning unit scans the first document, and the second scanning unit scans the second document that is reversely fed in the second path.

6. The method as claimed in claim 1, wherein the reversely driving of the exit unit comprises:
    reversely driving the exit unit after the first document is output to first reversely feed the second document in the second path;

reversely driving the exit unit after the first reversely feeding of the second document, to second reversely feed the second document in the second path; and scanning, by the scanning unit, the second document after the second reversely feeding in the second path.

7. The method as claimed in claim 1, wherein the second path is a duplex feeding path used to scan both sides of a document to be scanned.

8. The method as claimed in claim 1, wherein the spaced distance is determined according to a feeding speed of the simultaneously fed documents and according to a difference between a time when a sensor, of the image scanning device, detects the first document and a time when the sensor detects the second document.

9. The method as claimed in claim 1, further comprising:
determining whether the fed documents are simultaneously fed a change in a difference of a distance between a sensor and the fed documents while the fed documents pass the sensor.

10. The method as claimed in claim 1, wherein the predetermined minimum distance is determined according to a size of the exit unit, a pressure applied to the exit unit, and/or a hardness of the exit unit.

11. The method as claimed in claim 3, wherein the removing of the at least part of the second electronic image from the first electronic image comprises removing the at least part of the second electronic image by a show through removal (STR) operation.

12. An image scanning device comprising:
a scanning unit to scan a plurality of documents;
a first feeding unit provided on a first path to feed the documents in a feeding direction along the first path;
an exit unit to output the plurality of documents; and
a second feeding unit to feed one or more documents on a second path used to feed the one or more documents to an upstream side of the scanning unit in view of the feeding direction,
wherein when the plurality of documents are simultaneously fed by the first feeding unit on the first path, the scanning unit scans a first document of the simultaneously fed documents that is closest to the scanning unit, the exit unit is reversely driven after the exit unit outputs the first document so that the second feeding unit reversely feeds a second document of the simultaneously fed documents to the upstream side of the scanning unit, and the scanning unit scans the reversely fed second document.

13. The device as claimed in claim 12, further comprising:
a controller to remove, when at least a part of a scanned electronic image of the second document is included in a scanned electronic image of the first document, the at least part of the scanned electronic image of the second document from the scanned electronic image of the first document.

14. The device as claimed in claim 12, further comprising:
a controller to compare a spaced distance between the first and second documents with a predetermined minimum distance used to reversely drive the exit unit.

15. The device as claimed in claim 14, wherein the controller reversely drives the exit unit when the spaced distance is equal to or greater than the predetermined minimum distance, and does not reversely drive the exit unit when the spaced distance is less than the predetermined distance.

16. The device as claimed in claim 12, wherein:
the scanning unit comprises a first scanning unit and a second scanning unit, the first scanning unit and the second scanning unit are respectively disposed at opposite sides of the first path; and
the first scanning unit scans the first document, and the second scanning unit scans the reversely fed second document.

17. The device as claimed in claim 16, wherein the first scanning unit and the second scanning unit are disposed below and above, respectively, the first path.

18. The device as claimed in claim 12, wherein the scanning unit scans the second document after the second feeding unit reversely feeds the second document twice in the second path.

19. The device as claimed in claim 12, wherein the second path is a duplex feeding path used to scan both sides of a document to be scanned.

20. The device as claimed in claim 14, further comprising:
a sensor to detect the first document and the second document,
wherein the spaced distance is determined according to a feeding speed of the simultaneously fed documents and according to a difference between a time when the sensor detects the first document and a time when the sensor detects the second document.

21. The device as claimed in claim 12, further comprising:
a sensor to determine whether the documents are simultaneously fed by the first feeding unit according to a change in a difference of a distance between the sensor and the documents while the documents pass the sensor.

22. The device as claimed in claim 14, wherein the predetermined minimum distance is determined according to a size of the exit unit, a pressure applied to the exit unit, and/or a hardness of the exit unit.

23. The device as claimed in claim 12, wherein the first path and the second path overlap, and the feeding direction of the first feeding unit is opposite a feeding direction of the second feeding unit.

* * * * *